Jan. 13, 1925.

G. R. GREENSLADE 1,523,013

METHOD OF PRODUCING A CONDUCTIVE PATH BETWEEN SPACED ELECTRICAL CONDUCTORS

Filed May 24, 1922

WITNESSES

INVENTOR

Patented Jan. 13, 1925.

1,523,013

UNITED STATES PATENT OFFICE.

GROVER R. GREENSLADE, OF PITTSBURGH, PENNSYLVANIA, ASSIGNOR TO J. ROGERS FLANNERY, OF PITTSBURGH, PENNSYLVANIA.

METHOD OF PRODUCING A CONDUCTIVE PATH BETWEEN SPACED ELECTRICAL CONDUCTORS.

Application filed May 24, 1922. Serial No. 563,295.

*To all whom it may concern:*

Be it known that I, GROVER R. GREENSLADE, a citizen of the United States, and a resident of Pittsburgh, in the county of Allegheny and State of Pennsylvania, have invented a new and useful Improvement in Methods of Producing a Conductive Path Between Spaced Electrical Conductors, of which the following is a specification.

The invention relates to a method and means for producing a conductive path between spaced electrodes or conductors in an electric circuit, and particularly to render the space between said electrodes of unequal conductivity in opposite directions, whereby alternating currents or oscillations may be rectified or rendered unidirectional. The invention is particularly applicable to electrodes or conductors contained in an enclosed vessel such as any of the vacuous or gas tubes now known in the electrical art, and can be utilized for any of the purposes for which said tubes are now used.

Among the tubes or bulbs to which the invention can be applied are X-ray tubes, the well known gas bulbs for rectifying alternating currents for use in charging storage batteries and other purposes, and all similar or like bulbs no matter for what purpose used.

The object of the invention is to provide a method and means for producing between such spaced electrodes or conductors a conductive path of unequal conductivity in opposite directions in a manner to dispense with the hot electrode, i. e. the filament, and its source of energy, i. e. the battery or other source and associated rheostat, thus leading to simplification of the apparatus and also increasing the life or durability of the tube or bulb because there is no filament or other hot electrode to burn out.

The invention consists, in general, in rendering the space between said electrodes of unequal conductivity in opposite directions by associating with one or both of said electrodes a radio-active substance or substances and so controlling the emissions, emanations or radiations from said radio-active substance or substances that an electron stream flows from one of said electrodes to the other thereof, thereby providing between said electrodes a path which is of greater conductivity in one direction than in the other.

Figure 1:
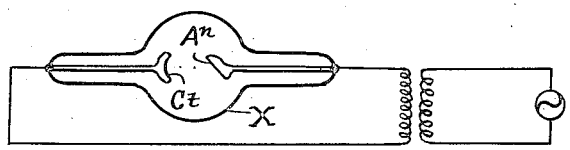
Figure 2:
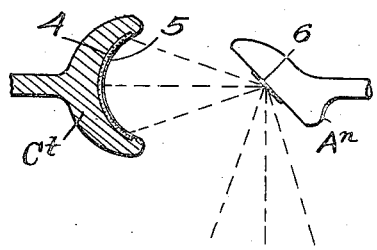
Figure 3:
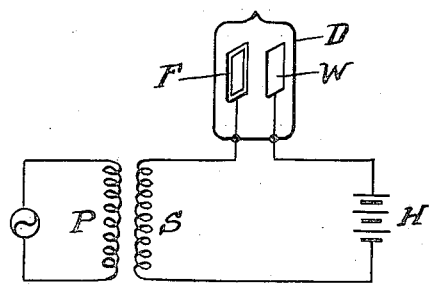
Figure 4:
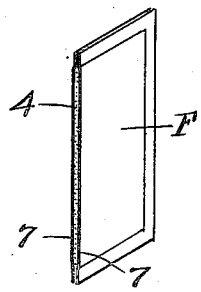

The accompanying drawings illustrate diagrammatically various forms and arrangements of bulbs or tubes in which the invention can be embodied, but without attempting to illustrate every use to which the invention can be applied. In the drawings Fig. 1 is a diagrammatic view illustrating the invention applied to an X-ray tube; Fig. 2 is an enlarged detail sectional view of the electrodes of said tube; Fig. 3 is a diagrammatic view showing the invention applied to a rectifier of alternating current, such as used for charging storage batteries and the like; and Fig. 4 is an enlarged detail sectional view of one of the electrodes employed in Fig. 3.

As shown in Fig. 1, X represents an X-ray tube containing the cathode $Ct$ and the anode $An$, and which is or can be similar to the now well known Coolidge tube. The cathode, instead of carrying a filament or other body to be rendered incandescent by current supplied either from a storage battery or from taps taken off the voltage increasing transformer, through additional leading-in wires, has associated with it a radio-active material, substance or compound, whose emissions, emanations or radiations produce an electron stream or its equivalent flowing from the cathode to the anode. The radio-active material may be either radium, uranium, thorium, actinium, polonium or any other radio-active substance, or compounds thereof. This can be applied to the cathode in any suitable manner, such as coating the mirror face of the metallic cathode with bromide of radium, or other appropriate compound of radium or equivalent material, or fusing the radio-active material polonium to said anode, or alloying it therewith, or in any other known way. Preferably, however, the radio-active material will be associated with the cathode in a manner to suppress certain of its omissions. Radio-active materials of the kind named undergo constant changes, and together with their breakdown or disintegration products emit three kinds of rays, to-wit, alpha rays, which are particles, to-wit, atoms of helium gas, and which carry positive electrical charges; beta rays, which are electrons and constitute negative electrical charges; and gamma rays which are oscillatory disturbances of a character of light rays except that they are of very high frequency, and are neither positive nor negative. To the extent that alpha rays are present with beta rays, the unilateral conductivity of the space between the electrodes is reduced or interferred with. In order to intercept the alpha rays, the radio-active material 4 is applied to the mirror face of the cathode by enclosing it by means of a thin sheet or foil 5 of aluminum or other metal. Aluminum foil of a thickness of 7/100 of a millimeter has been found to efficiently screen out or intercept all or substantially all of the alpha rays, without materially interfering with the passage of the beta rays. If the screen is formed of a metal denser than aluminum it should be thinner than above specified.

By applying the radio-active substance to the cathode in this manner, substantially only negative electrical charges, to-wit, electrons, are permitted to be emitted by the cathode, and these bombard the anode and produce the X-rays. Consequently the space between the electrodes is rendered of substantial unilateral conductivity, or at least of a much greater conductivity in one direction than in the other. Hence the tube acts as a rectifier, so that outside rectifiers for alternating current can be entirely dispensed with, and it does this without the use of a hot filament with its separate leading-in wires and outside control and current supply means. Hence the apparatus as a whole is greatly simplified, and its life or durability is also increased because there is no hot filament to burn out.

The unilateral conductivity of the space between the cathode and anode can be enhanced by associating with the anode a radio-active substance whose emissions, emanations of radiations are of an opposite electrical charge characteristic from those emitted by the cathode; for instance, polonium which is of a character constituting or carrying positive electrical charges or ions; or by controlling the emissions from the radio-active substance applied to the anode in such manner as to allow only the desired quantity of opposite electrical charges to be emitted. This may be accomplished by varying the quantity of radio-active substance on the anode. The presence of a radio-active substance on the anode is indicated at 6 in Fig. 2.

Figs 3 and 4 show the invention applied to a two-electrode bulb D connected in a circuit to serve as a rectifier of alternating current, the diagram showing the bulb for rectifying alternating current supplied by the transformer PS and used for charging a storage battery H. The space between the electrodes F and W is rendered of unilateral conductivity, or at least of unequal conductivity in opposite directions, by associating with the electrode F a suitable radio-active material in the same manner as described in connection with the cathode of the X-ray tube shown in Figs. 1 and 2, whose emissions, emanations or radiations produce an electron stream or its equivalent flowing from the electrode F to the electrode W, thus rendering that space of unequal conductivity in opposite directions. This characteristic may here also be enhanced by associating with the electrode W a radio-active substance such as previously noted, emitting rays, or having its emissions so controlled as to emit rays of the opposite electrical charge characteristic from those emitted by the electrode F. In this instance also the emissions from the radio-active substance associated with the electrode F are controlled by suppressing one kind of rays, such for instance as the alpha rays, by enclosing the radio-active substance in the electrode. This can be conveniently done in bulbs which permit only of light-weight electrodes, by forming the electrode of thin metal foil shaped as a closed pocket or envelope in which the radio-active substance is enclosed, as shown in Fig. 4,—the walls 7 of said pocket or envelope serving as the screen for the alpha rays, in a similar way that said rays are screened out in the form of electrode shown in Fig. 2. The bulb D here shown can be used in place of the present-day hot filament gas rectifiers used for charging storage batteries from alternating current or similar uses.

It will thus be seen that the invention may be applied in any of the vacuous or gas tubes now known in the electrical art, and can be utilized for any of the purposes for which said tubes are now used. It is applicable to tube which are highly exhausted, to those which are exhausted only partly, to the so-called "gas tubes," and indeed to any spaced electrodes between which it is desired to establish an asymmetrical conducting path. Many other uses for the invention in addition to those heretofore named will suggest themselves to the skilled man in the art.

The invention produces a more lasting construction of bulb or tube than as heretofore constructed, because of the short life of the hot electrode or filament in the prior tubes. With the present invention the hot electrode or filament is replaced by a cold metallic electrode and the electron stream, or its equivalent, is produced by the emissions, emanations or radiations, properly controlled, of a radio-active substance or substances associated with one or both of the electrodes. The invention also permits of the use of simpler apparatus because it entirely dispenses with the battery or other source of heating current, and its controlling rheostat, which are necessary with the hot filament tubes.

I claim:

1. The method of rendering the space between electrodes of unequal conducitivity in opposite directions, which consists in associating with one of said electrodes a radioactive substance emitting alpha and beta rays, and controlling said emissions in a manner to suppress one kind of such rays.

2. The method of rendering the space between electrodes of unequal conducitivity in opposite directions, which consists in associating with one of said electrodes a radio-active substance emitting alpha and beta rays, and controlling said emissions in a manner to suppress the alpha rays.

3. The method of rendering the space between electrodes of unequal conducitivity in opposite directions, which consists in so associating with both electrodes radioactive substances as to cause one of said electrodes to emit rays constituting negative electrical charges and the other electrode to emit rays carrying positive electrical charges.

4. The method of rendering the space between electrodes of unequal conducitivity in opposite directions, which consists in associating with both electrodes radio-active substances and controlling the emissions from said electrodes in a manner that the predominating radiations from one of said electrodes consist of beta rays and the predominating radiations from the other electrode consist of alpha rays.

5. The method of rendering the space between electrodes of unequal conducitivity in opposite directions, which consists in associating with one of said electrodes a radio-active substance emitting alpha and beta rays, suppressing the alpha rays, and associating with the other electrode radio-active substance emitting alpha rays.

In testimony whereof, I sign my name.

GROVER R. GREENSLADE.

Witness:
Edwin O. Johns.